US012303985B2

(12) United States Patent
Nagasaka

(10) Patent No.: US 12,303,985 B2
(45) Date of Patent: May 20, 2025

(54) DRIVER DRILL

(71) Applicant: MAKITA CORPORATION, Anjo (JP)

(72) Inventor: Hidenori Nagasaka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 471 days.

(21) Appl. No.: 17/664,933

(22) Filed: May 25, 2022

(65) Prior Publication Data

US 2022/0388074 A1    Dec. 8, 2022

(30) Foreign Application Priority Data

Jun. 4, 2021  (JP) ................................. 2021-094609

(51) Int. Cl.
| | | |
|---|---|---|
| *B23B 31/12* | (2006.01) | |
| *B25F 5/00* | (2006.01) | |

(52) U.S. Cl.
CPC .... *B23B 31/1238* (2013.01); *B23B 2260/008* (2013.01); *B25F 5/001* (2013.01); *Y10T 279/17632* (2015.01)

(58) Field of Classification Search
CPC .......... B23B 31/1238; B23B 2260/008; B23B 31/18; B25B 21/00; B25F 5/00; B25F 5/001; Y10T 279/17632
See application file for complete search history.

(56) References Cited

U.S. PATENT DOCUMENTS

| | | | |
|---|---|---|---|
| 5,348,317 A | | 9/1994 | Steadings et al. |
| 5,746,436 A | * | 5/1998 | Kulan .................... B23B 31/18 |
| 6,382,636 B1 | | 5/2002 | Walker |
| 8,091,650 B2 | | 1/2012 | Van der Linde et al. |
| 2001/0045714 A1 | | 11/2001 | Barton et al. |
| 2009/0003949 A1 | | 1/2009 | Mok et al. |
| 2010/0193207 A1 | * | 8/2010 | Mok ................... B23B 31/1238 |

(Continued)

FOREIGN PATENT DOCUMENTS

| | | |
|---|---|---|
| CN | 110560717 A | 12/2019 |
| EP | 1040888 A1 | 10/2000 |

(Continued)

OTHER PUBLICATIONS

Office Action from the Japanese Patent Office in related JP application No. 2021-094609 dispatched Oct. 15, 2024, and machine translation thereof.

*Primary Examiner* — Eric A. Gates
(74) *Attorney, Agent, or Firm* — J-TEK LAW PLLC; Jeffrey D. Tekanic; Scott T. Wakeman

(57) ABSTRACT

A driver-drill (1) includes a motor (16), a spindle (32), which is rotationally driven using rotational energy output by the motor (16), and a chuck (30), which rotates integrally with the spindle (32). The chuck (30) includes: a chuck body (31); a chuck sleeve (80), which is externally mounted on the chuck body (31); and two or more chuck jaws (67), which are provided in the chuck body (31) and which expand and contract relative to the rotational axis of the spindle (32) in response to manual rotation of the chuck sleeve (80). The spindle (32) may be integrally formed (in one piece) with the chuck body (31). In addition or in the alternative, the chuck body (31) may be rotatably supported by a bearing (42) disposed in a tube-shaped housing (6).

20 Claims, 9 Drawing Sheets

(56) References Cited

U.S. PATENT DOCUMENTS

2015/0306675 A1* 10/2015 Dedrickson ..... Y10T 279/17632
2022/0055120 A1 2/2022 Zhong et al.

FOREIGN PATENT DOCUMENTS

| GB | 2309404 A | 7/1997 |
|---|---|---|
| JP | H09192909 A | 7/1997 |
| JP | H11500669 A | 1/1999 |
| JP | 2000288810 | 10/2000 |
| JP | 2004216511 A | 8/2004 |
| JP | 2009006475 | 1/2009 |
| JP | 2021024043 A | 2/2021 |

* cited by examiner

DRIVER DRILL

CROSS-REFERENCE

The present application claims priority to Japanese patent application serial number 2021-094609 filed on Jun. 4, 2021, the contents of which are incorporated fully herein by reference.

TECHNICAL FIELD

The present disclosure relates to a driver-drill, and in particular, to a chuck therefor.

BACKGROUND ART

Known driver-drills include a motor that is housed rearward of a gear housing, which extends in a front-rear direction, and a spindle that is arranged forward of the motor and is operably coupled to the motor via a speed-reducing mechanism. The spindle protrudes forward from the gear housing, and a drill chuck is mounted on a mounting portion (a screw part), which is provided on a front end portion of the spindle. The drill chuck comprises a plurality of (e.g., 3) chuck jaws that expands and contracts relative to an axial center (rotational axis of the spindle) in response to manual rotation of a chuck sleeve. A bit (e.g., a drill bit) is holdable, coaxially with the spindle, by the chuck jaws.

SUMMARY

With regard to such a known driver-drill, because the drill chuck, which is a separate body from the spindle, is mounted at (on) the front end portion of the spindle forward of the gear housing, the overall length of the driver-drill is relatively long in the front-rear direction (i.e. the direction along the rotational axis of the spindle). In addition, because only the spindle, on which the drill chuck is mounted, is supported by a bearing within the housing, an improvement of the runout accuracy of the drill chuck, which protrudes considerably forward of the bearing, cannot be achieved.

Accordingly, it is one non-limiting object of the present disclosure to disclose techniques for making a driver-drill more compact in the axial direction, e.g., by making it possible to shorten the overall length of the spindle in the axial (front-rear) direction.

In addition or in the alternative, it is another non-limiting object of the present disclosure to disclose techniques for making a driver-drill more compact in the radial direction and/or for improving runout accuracy.

In one aspect of the present disclosure, a driver-drill may preferably comprise: a motor; a spindle, which is rotationally driven using rotational energy output by the motor (i.e. the spindle is rotated in response to rotation of a rotary shaft of the motor); and a chuck (chuck part), which rotates integrally (in a rotationally fixed manner) with the spindle.

The chuck preferably comprises: a chuck body; a chuck sleeve, which is externally mounted on the chuck body; and two or more chuck jaws, which are provided in the chuck body and expand and contract (radially spread apart and converge together) relative to an axial direction (rotational axis) of the spindle in response to manual rotation of the chuck sleeve.

Furthermore, the spindle preferably is formed integrally (in one part) with the chuck body, e.g., such that there is no seam therebetween.

In another aspect of the present disclosure, a driver-drill preferably comprises: a motor; a spindle, which is rotationally driven using rotational energy output by the motor (i.e. the spindle is rotated in response to rotation of a rotary shaft of the motor); and a chuck (chuck part), which rotates integrally (in a rotationally fixed manner) with the spindle.

The chuck preferably comprises: a chuck body; a chuck sleeve, which is externally mounted on the chuck body; and two or more chuck jaws, which are provided in the chuck body and expand and contract (radially spread apart and converge together) relative to an axial direction (rotational axis) of the spindle in response to manual rotation of the chuck sleeve.

Furthermore, the chuck body preferably is rotatably supported by a bearing, which is disposed within a tube-shaped housing that houses a rearward portion of the chuck body, wherein an inner ring of the bearing is located more outward in the radial direction than the chuck jaws, i.e. a circumscribed circle of the rearward ends of the chuck jaws has a smaller diameter than the inner diameter of the bearing.

According to the above-described first aspect of the present disclosure, the overall length of the chuck, which includes the spindle, in the axial direction (front-rear direction) can be made shorter than that of the known structure described in the introduction, in which the drill chuck is a separate body that is coupled to the spindle. Consequently, the overall length of the spindle in the axial direction can be shortened, thereby resulting in a more compact driver-drill in the axial (front-rear) direction.

According to the above-described second aspect of the present disclosure, because the chuck body is directly supported by the bearing, an improvement of the runout accuracy results. In addition, the chuck body, which includes (holds) the chuck jaws, can be made more compact in the radial direction.

DETAILED DESCRIPTION

Figure 1:
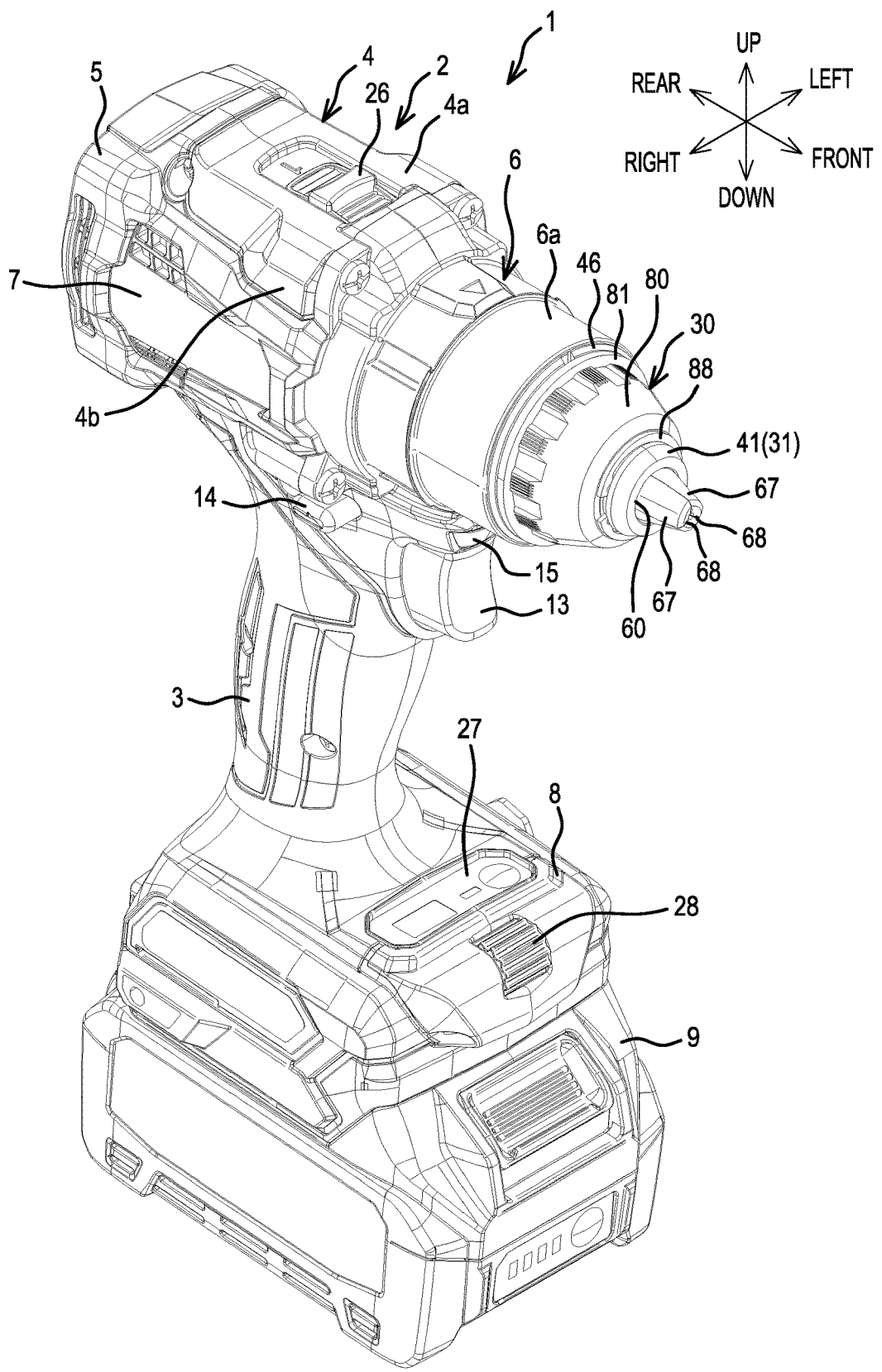
FIG. 1 is an oblique view, viewed from the front, of a representative, non-limiting driver-drill according to the present disclosure.

In another aspect of the present disclosure: the spindle may be disposed in a front-rear direction within a tube-shaped housing, which protrudes forward, and a rear end of the spindle may be supported by a first bearing within the housing. Furthermore, the chuck body may be rotatably supported by a second bearing, which is disposed forward of the first bearing within the housing. According to this configuration, an improvement of runout accuracy can be achieved. In addition, because a portion of the chuck body can be received within the housing, the driver-drill can be made more compact in the axial (front-rear) direction.

In another aspect of the present disclosure: a forward portion of the chuck body may protrude forward from the housing more than the second bearing does; and the chuck sleeve may be externally mounted on a protruding portion of the chuck body. According to this configuration, the chuck sleeve can be easily assembled onto the chuck body during the manufacturing process.

In another aspect of the present disclosure, an outer diameter of the chuck, which includes the chuck sleeve, may be smaller than an outer diameter of the housing. According to this configuration, the chuck can be made more compact also in the radial direction.

In another aspect of the present disclosure, the second bearing may mate with a receiving surface defined on an inner-circumferential surface of the housing. In addition, the second bearing may be held within the housing, and may be retained by a bearing retainer screwed into the receiving surface that is located forward of the second bearing. According to this configuration, the assembly and positioning of the second bearing within the housing can be performed from the front in a simple manner.

In another aspect of the present disclosure, the second bearing may be disposed more outward in the radial direction of the housing than the chuck jaws are. In other words, the inner diameter of the second bearing is preferably larger than a circumscribed circle defined by the rearward ends of the chuck jaws. According to this configuration, the chuck body, which includes the chuck jaws, can be made more compact in the radial direction.

In another aspect of the present disclosure, during manufacture, the chuck sleeve may be caused to engage with the chuck body by being externally mounted on the chuck body from the front and may be retained by a retaining member. According to this configuration, the chuck sleeve can be assembled onto the chuck body in a simple manner during the manufacturing process.

In another aspect of the present disclosure, the chuck sleeve may contact a stop part, which is provided on an outer circumference of the chuck body, and thereby may be positioned in the rearward direction. According to this configuration, the positioning of the chuck sleeve in the rearward direction can be performed easily.

WORKING EXAMPLES

Working examples of the present disclosure are explained below, with reference to the drawings.

Figure 2:
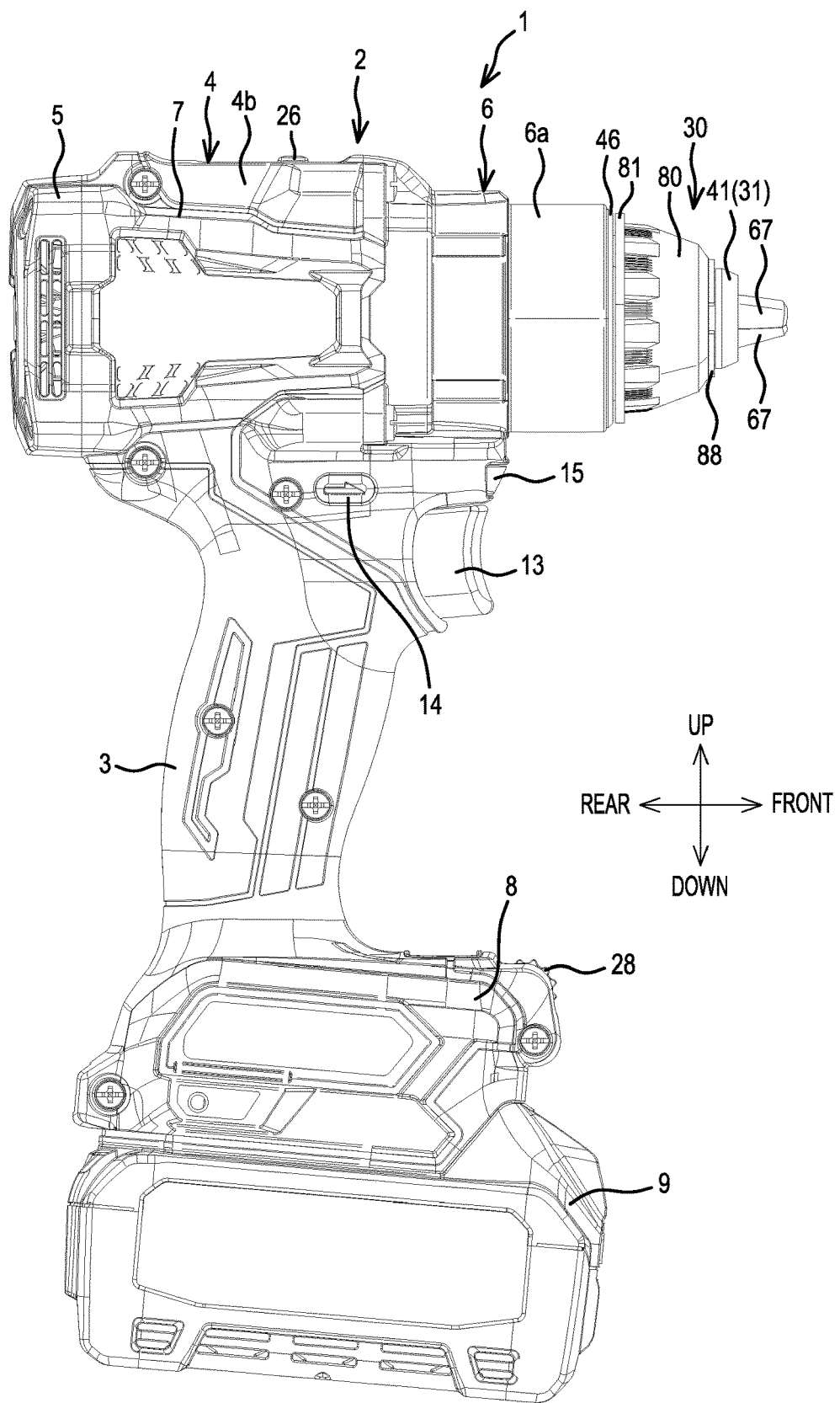
FIG. 2 is a side view of the driver-drill.
Figure 3:
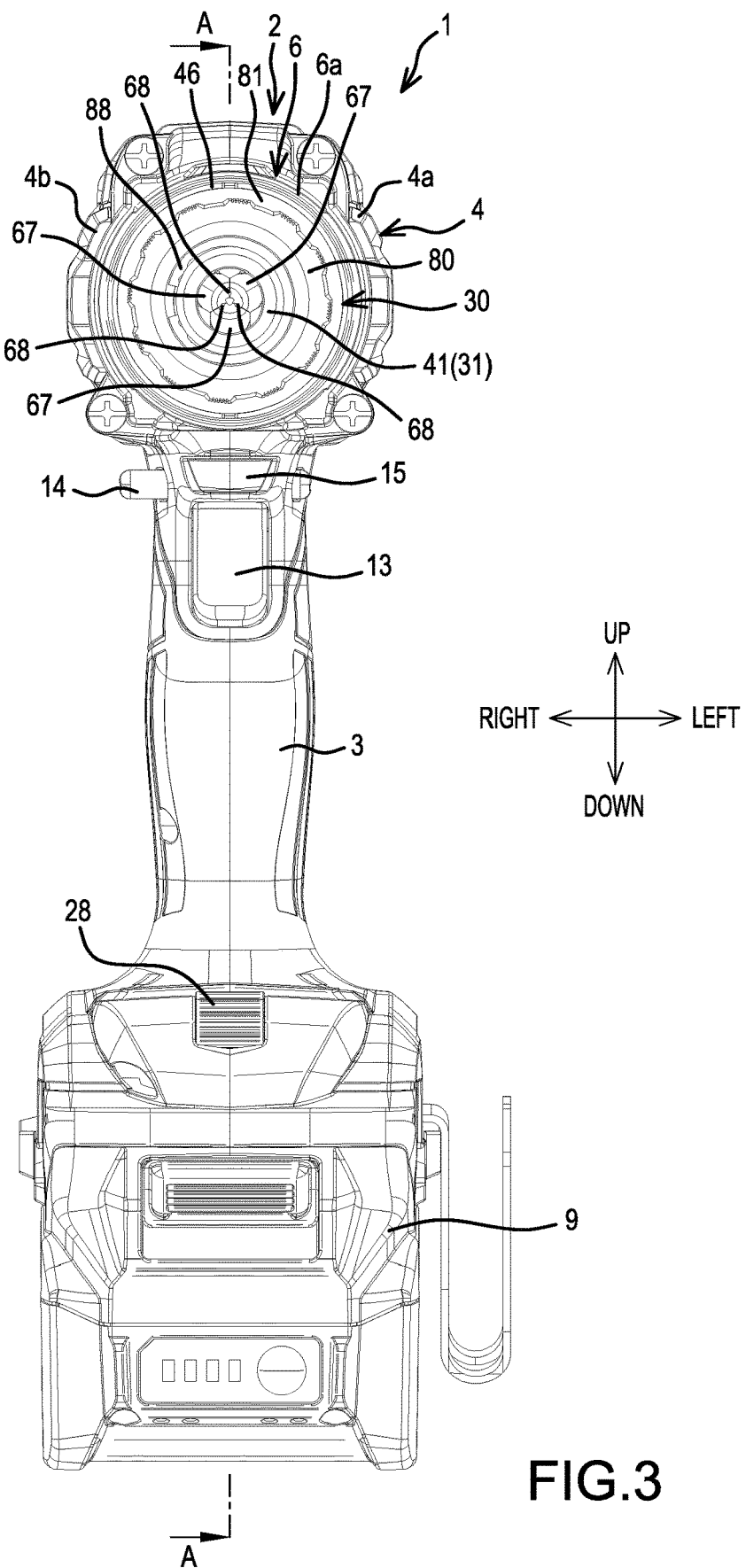
FIG. 3 is a front view of the driver-drill.
Figure 4:
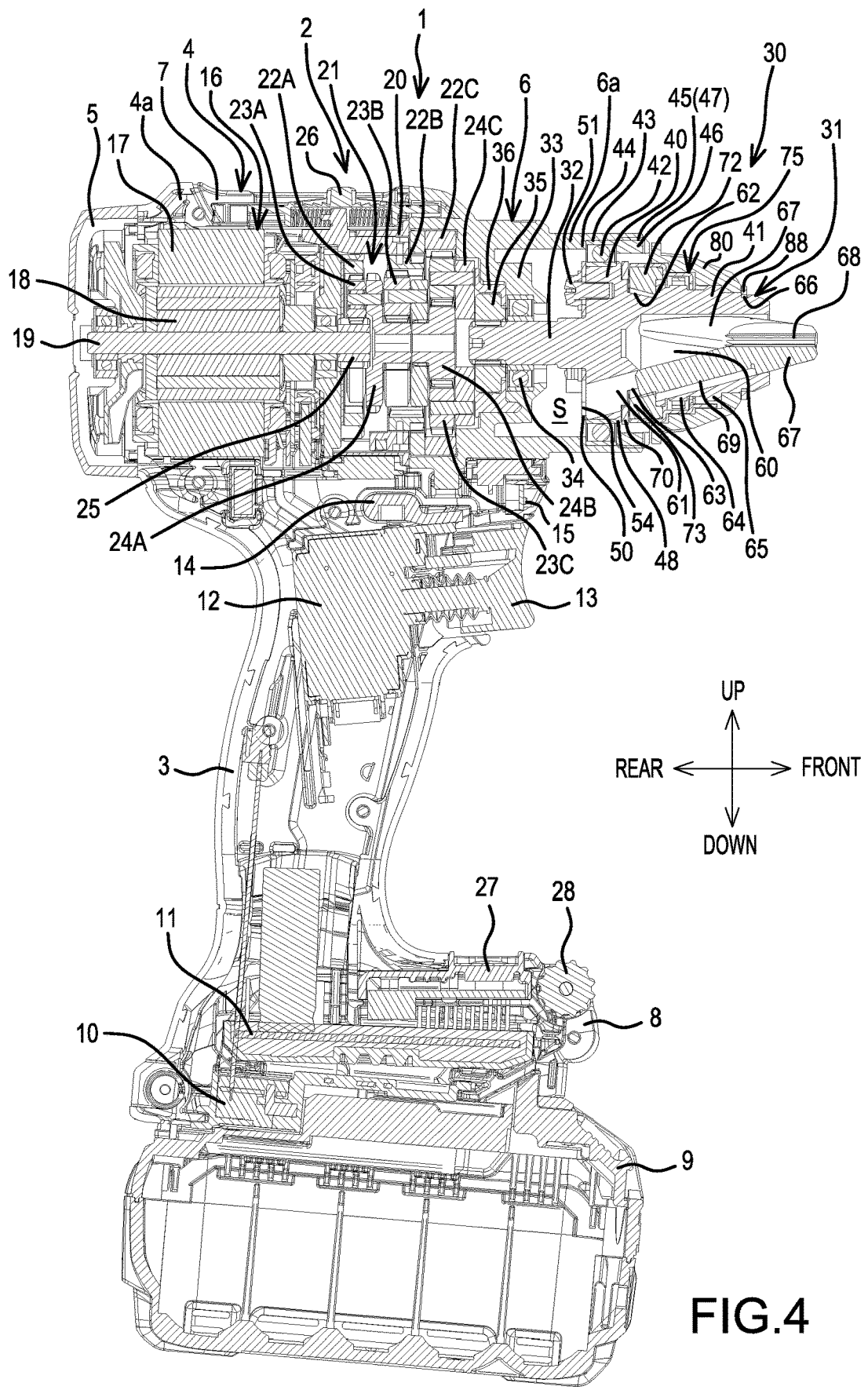
FIG. 4 is a cross-sectional view taken along line A-A in FIG. 3.

FIG. 1 is an oblique view, viewed from the front, that shows one representative, non-limiting example of a driver-drill according to the present disclosure; FIG. 2 is a side view thereof; FIG. 3 is a front view thereof; and FIG. 4 is a cross-sectional view thereof taken along line A-A in FIG. 3.

A driver-drill 1 comprises a main body 2 and a grip part 3. The main body 2 extends in the front-rear direction. The grip part 3 protrudes from the lower side of the main body 2. The main body 2 and the grip part 3 have a T shape, viewed from either the left or right directions.

The housing of the driver-drill 1 comprises a main-body housing 4, a rear cover 5, and a gear housing 6. A motor-housing part 7, which has a tube shape, and the grip part 3 are coupled to the main-body housing 4. The main-body housing 4 is formed by screw-fastening left and right half housings 4a, 4b together. The rear cover 5 is screw-fastened from the rear to the motor-housing part 7. The gear housing 6 has a tube shape, and a rear portion thereof is screw-fastened from the front to the motor-housing part 7.

A battery-mounting part 8 is defined at a lower end of the grip part 3. A battery pack 9 is slide-mounted, from the front, on the battery-mounting part 8. A terminal block 10 is held at a lower surface of the battery-mounting part 8. A controller 11 is housed in the interior of the battery-mounting part 8 on the upper side of the terminal block 10. The battery pack 9 is electrically connected to the terminal block 10. The controller 11 comprises a control circuit board on which a microcontroller for controlling a motor 16, switching devices, and the like, which are described below, are mounted.

A switch 12 is housed in an upper portion within the grip part 3. The switch 12 comprises a trigger 13, which protrudes forward. A forward/reverse-changing button 14 of the motor 16 is provided on the upper side of the switch 12. A light 15 is provided forward of the forward/reverse-changing button 14.

The motor 16 is housed in the motor-housing part 7. The motor 16 is an inner-rotor-type brushless motor comprising a stator 17 and a rotor 18, which is disposed in the interior of the stator 17. The rotor 18 comprises a rotary shaft 19, which extends in the front-rear direction.

Forward of the motor 16, a gear case 20 is provided within the motor-housing part 7. A speed-reducing mechanism 21 is provided within the gear case 20. The speed-reducing mechanism 21 comprises three internal gears 22A-22C, three sets of planet gears 23A-23C, and three carriers 24A-24C respectively arranged in three stages in the axial direction. A pinion 25, which is provided on the rotary shaft 19, meshes with the planet gears 23A of the first stage.

The internal gear 22B of the second stage is configured to be movable (shiftable) in the front-rear direction. A speed-changing lever 26, which changes (shifts) the position of the internal gear 22B in the front-rear direction, is provided on an upper surface of the motor-housing part 7. When the speed-changing lever 26 is slid forward, the internal gear 22B advances and meshes (engages) with the planet gears 23B of the second stage, resulting in a low-speed mode (speed '1'). When the speed-changing lever 26 is slid rearward and meshes (engages) with the planet gears 23A of the first stage, the internal gear 22B moves rearward, resulting in a high-speed mode (speed '2').

The gear housing 6 comprises a front-end part 6a, which has the smallest diameter. A chuck part (chuck) 30 is held at the front-end part 6a. The chuck part 30 comprises a chuck body 31. A spindle 32 is integrally provided at a rear portion of the chuck body 31. In other words, the spindle 32 is cast or machined from the same piece of metal that forms the chuck body 31, such that there is no seam between the spindle 32 and the chuck body 31.

The spindle 32 protrudes rearward coaxially with the gear case 20. Forward of the speed-reducing mechanism 21, a bearing-retaining part 33 is provided on the gear housing 6. The spindle 32 is supported in a rotatable manner by a first bearing 34, which is held in the bearing-retaining part 33. The rear end of the spindle 32 is splined with a lock cam 35. The lock cam 35 is integrally provided, in the rotational direction, with the carrier 24C of the third stage rearward of the bearing 34. A lock ring 36 is provided on the front side of the lock cam 35. The lock ring 36 engages with the bearing-retaining part 33 and thereby is rotationally restricted, i.e. the lock ring 36 is coupled to the bearing-retaining part 33 such that the lock ring 36 is fixed to the gear housing 6 and thus is not rotatable relative to the gear housing 6.

A plurality of tabs (not shown) is provided on a front surface of the carrier 24C. Wedge pins (not shown) are provided between the tabs. When the chuck body 31 is manually rotated while the motor 16 is in the stopped state (i.e. the rotor 18 is not rotating), rotation of the spindle 32 is locked (blocked, restricted) by the wedge pins engaging between the lock cam 35 and the lock ring 36.

Figure 5:
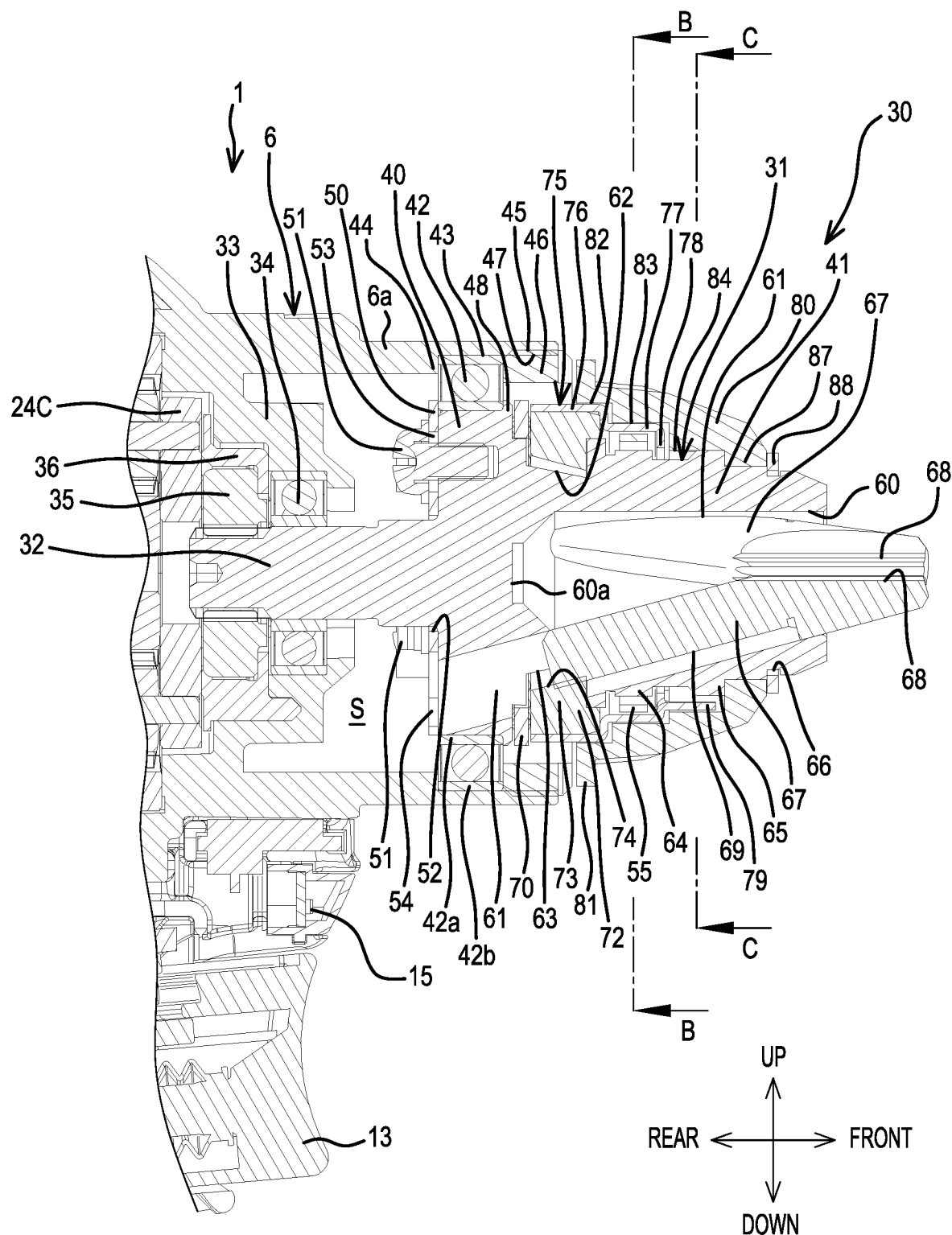
FIG. 5 is an enlarged view of a chuck part shown in FIG. 4.
Figure 6:
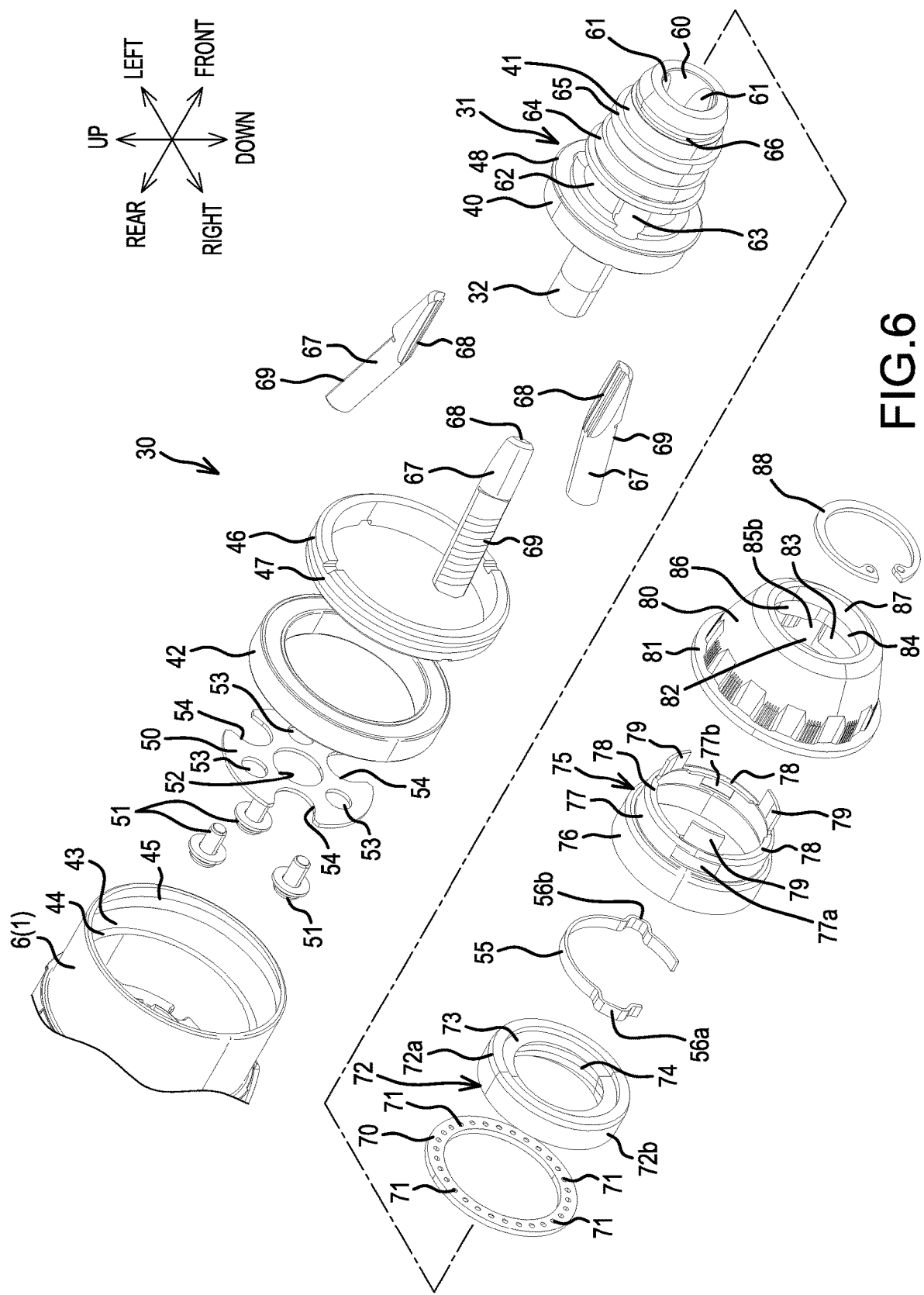
FIG. 6 is an exploded, oblique view, viewed from the front, of the chuck part.
Figure 7:
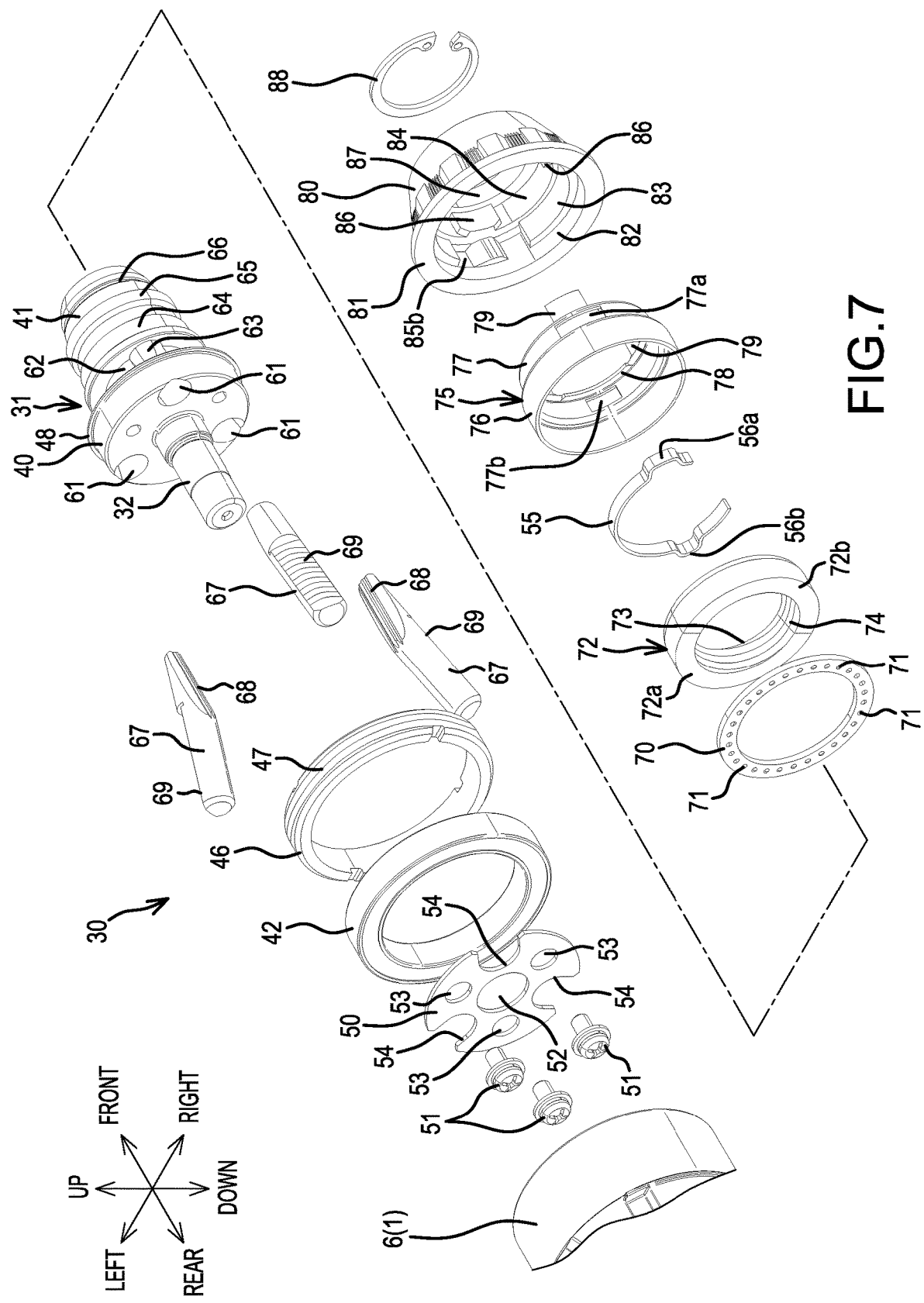
FIG. 7 is an exploded, oblique view, viewed from the rear, of the chuck part.

As shown in FIGS. 5-7, the chuck body 31 comprises a discoidal (disk-shaped) part 40 on the rear side and a tubular part 41 on the front side. The spindle 32 extends integrally (in one piece) from the rear-side, center of the discoidal part 40.

The discoidal part 40 is formed with a diameter smaller than an inner diameter of the front-end part 6a of the gear housing 6. The discoidal part 40 is supported by a second bearing 42 within the gear housing 6. The second bearing 42 is externally mounted, from the rear, on the discoidal part 40; i.e. the second bearing 42 radially surrounds the discoidal part 40. The second bearing 42 is inserted, from the front, into a receiving surface 43, which is formed, from a front end, on an inner-circumferential surface of the front-end part 6a. The second bearing 42 comprises an inner ring 42a and an outer ring 42b. A step part (stop) 44, with which a rear surface of the outer ring 42b of the second bearing 42 makes contact, is defined at a rear end of the receiving surface 43. A female-thread part (female thread) 45 is formed on the forward side of the receiving surface 43. A ring-shaped bearing retainer 46 has a male thread (screw part) 47, which is defined on the outer circumference of the bearing retainer 46 and is screwed into the female-thread part 45. The bearing retainer 46 makes contact with a front surface of the outer ring 42b of the bearing 42, thereby positioning (holding, fixing) the second bearing 42 in the front-rear direction between the step part 44 and the bearing retainer 46. In this state, the step part 44 and the bearing retainer 46 do not contact the inner ring 42a of the bearing 42.

A flange 48, with which the inner ring 42a of the second bearing 42 makes contact, is formed on a front end of the discoidal part 40. The flange 48 has a diameter larger than the inner diameter of the second bearing 42. On a rear surface of the discoidal part 40, a restricting plate 50 is fixed by three screws 51. Like the flange 48, the restricting plate 50 also has a diameter larger than the inner diameter of the second bearing 42. A through hole 52 for the spindle 32 is defined in the center of the restricting plate 50. Three through holes 53, through which the screws 51 respectively pass, are defined equispaced concentrically around the through hole 52. Three notched parts 54 are formed equispaced in the circumferential direction on the outer circumference of the restricting plate 50 between the through holes 53, 53.

In the state in which the inner ring 42a makes contact with the flange 48, the rear surface of the discoidal part 40 is approximately flush with the rear surface of the second bearing 42. In this state, after the restricting plate 50 has been fixed by the screws 51 to the rear surface of the discoidal part 40, the second bearing 42 is positioned (held, fixed) in the front-rear direction between the flange 48 and the restricting plate 50, which contact the inner ring 42a from the front and rear, respectively, and is integrated with the discoidal part 40; i.e. the inner ring 42a is fixed to the discoidal part 40 so that they rotate together.

The tubular part 41 has a tapered shape whose diameter becomes smaller in steps as it extends in the forward direction. The tubular part 41 has a bottomed hole (blind hole) 60 whose diameter is smaller than that of the discoidal part 40, is open forward at the center, and whose rear end constitutes a bottom 60a. Three slanted (inclined) holes 61, which pass through to the rear surface of the discoidal part 40, are formed (defined) in the bottomed hole 60. Each of the slanted holes 61 is slanted (inclined or oblique relative to the rotational axis of the chuck body 31), as it extends in the rearward direction, in the direction leading away from the axis of the tubular part 41. The restricting plate 50 is screw-fastened to the discoidal part 40 such that the slanted holes 61, which open to (at) the rear surface of the discoidal part 40, are aligned with the corresponding notched parts 54 of the restricting plate 50. Consequently, the restricting plate 50 does not block or impede rearward movement of chuck jaws 67.

A neck part 62 is formed at the base of the tubular part 41. Three communication openings 63, which respectively communicate with the three slanted holes 61, are formed in the neck part 62. Forward of the neck part 62, a rear ridge 64 and a front ridge 65, each of which has a ring shape, are formed at prescribed spacings in the front-rear direction on the outer circumference of the tubular part 41. A latching groove 66 is formed in a ring shape forward of the front ridge 65.

One chuck jaw 67 is provided in each of the slanted holes 61. Each of the chuck jaws 67 comprises a grasp part 68 on (at) its front end and the three chuck jaws 67 are arranged such that the grasp parts 68 face one another. A screw part (male thread) 69, which has a curved-surface shape, is formed on a rear-portion of the radially outer surface of each of the chuck jaws 67. Each of the chuck jaws 67 is housed (disposed) within the corresponding slanted hole 61 so as to be capable of linear movement along the slant thereof, as will be further explained below. The screw parts 69 are exposed at the neck part 62 via the respective communication openings 63.

A thrust washer 70 is externally mounted on the rear side of the neck part 62 at the base of the tubular part 41; i.e. the thrust washer 70 radially surrounds a rearward portion of the neck part 62. Balls 71 are disposed (held) in the thrust washer 70 so as to be equispaced in the circumferential direction.

A screw ring 72 is externally mounted in a rotatable manner on the neck part 62 on the front side of the thrust washer 70. The screw ring 72 is composed of two semicircular-shaped half portions 72a, 72b, which are split left and right. On its inner circumference, the screw ring 72 comprises a mating part 73, which mates with the neck part 62. A female-thread part 74 is formed on an inner-circumferential surface of the mating part 73. The female-thread part 74 is tilted in a tapered shape aligned with the tilt of the chuck jaws 67 and is screwed (threadably engaged) with the screw parts (male threads) 69 of the chuck jaws 67.

With regard to the screw ring 72, the half portions 72a, 72b are press-fitted into a coupling tube 75, and thereby are coupled to one another in a ring shape. The coupling tube 75 comprises a large-diameter part 76 on its rear side and a small-diameter part 77 on its front side. The half portions 72a, 72b of the screw ring 72 are press-fitted into the large-diameter part 76.

Two openings 77a, 77b are formed in the small-diameter part 77. The openings 77a, 77b are disposed about the axial center of the coupling tube 75 at locations at which they have point symmetry, i.e. the openings 77a, 77b diametrically oppose each other. The openings 77a, 77b extend in the circumferential direction of the small-diameter part 77. The length of the opening 77a in the circumferential direction is longer than the length of the opening 77b.

Three folded-back parts 78 and three latching-plate parts 79 are provided at the front end of the small-diameter part 77. The folded-back parts 78 are disposed equispaced in the circumferential direction of the small-diameter part 77 and are formed such that they are each folded back toward the center in an arcuate shape. Each of the folded-back parts 78 is latched to the front side of the rear ridge 64 of the tubular part 41. The latching-plate parts 79 are disposed equispaced in the circumferential direction between the folded-back parts 78. Each of the latching-plate parts 79 is formed such that it faces (extends) forward.

A plate spring (C-shaped spring or clip) 55 is held within the small-diameter part 77. The plate spring 55 extends in the circumferential direction of the small-diameter part 77 and is formed in a C shape in front view. Two projection parts (protrusions) 56a, 56b, which protrude outward in the radial direction and extend in the circumferential direction, are formed at diametrically opposite portions of the plate spring 55. The projection parts 56a, 56b are thus disposed spaced apart in the circumferential direction of the plate spring 55. The length of the projection part 56a in the circumferential direction is longer than the length of the projection part 56b.

Figure 8:
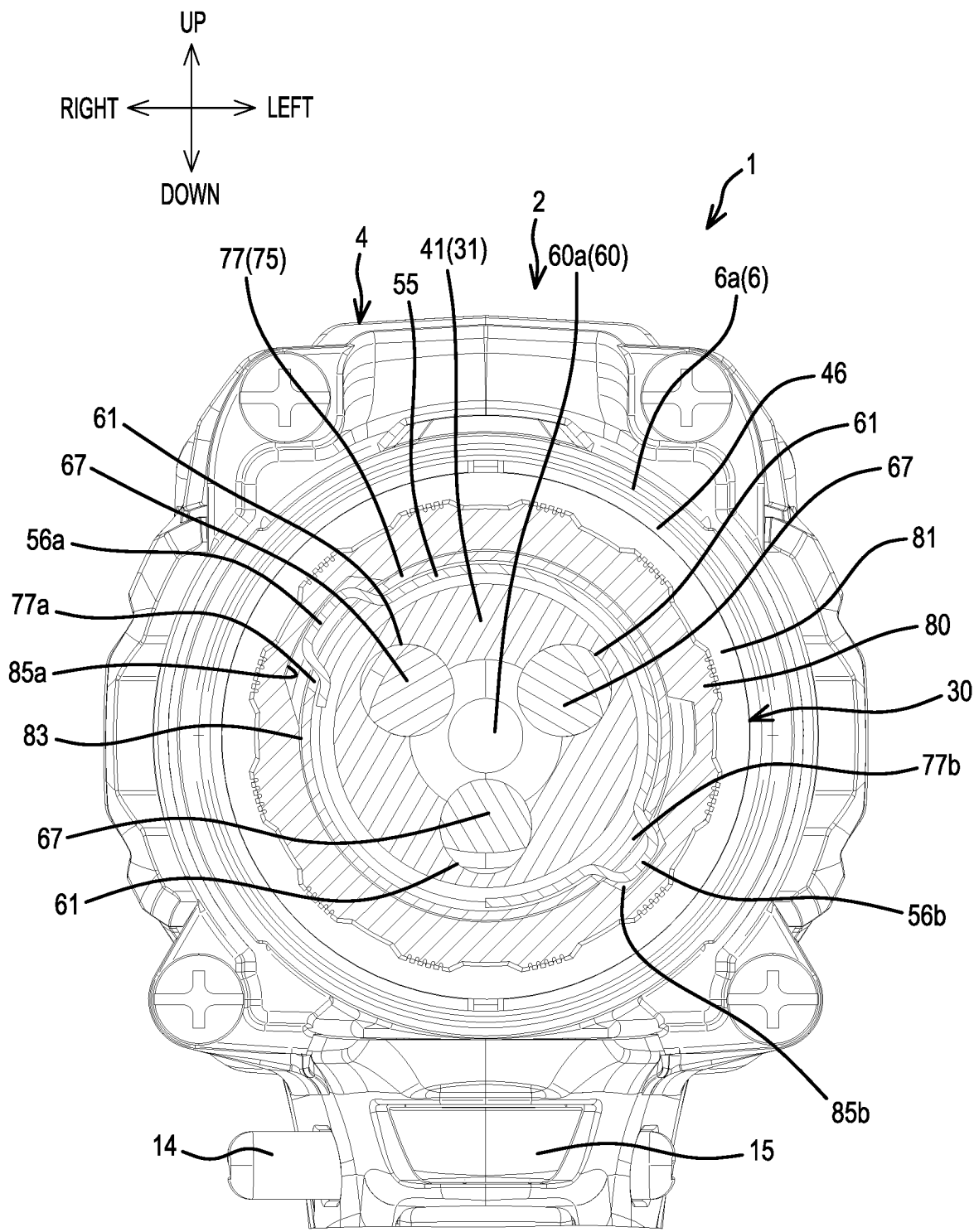
FIG. 8 is a cross-sectional view taken along line B-B in FIG. 5.

As shown in FIG. 8, the plate spring 55 is housed, in the state in which its diameter is slightly reduced, within the small-diameter part 77. At this time, the projection part 56a mates, from the inner side, with the opening 77a; and the projection part 56b mates, from the inner side, with the opening 77b. In this state, the projection parts 56a, 56b protrude outward in the radial direction from (through, across) the openings 77a, 77b.

A chuck sleeve 80 is externally mounted on the tubular part 41. The chuck sleeve 80 is configured such that its diameter becomes smaller as it goes forward. A flange part 81, which projects outward in the radial direction, is formed at a rear end of the chuck sleeve 80. The flange part 81 is configured such that its diameter is smaller than that of the outer diameter of the front-end part 6a of the gear housing 6. In the assembled state of the chuck part 30, the flange part 81 is proximate to a front surface of the bearing retainer 46.

A rear inner-diameter part 82, a middle inner-diameter part 83, whose diameter is smaller than that of the rear inner-diameter part 82, and a front inner-diameter part 84, whose diameter is smaller than that of the middle inner-diameter part 83, are formed (defined) in a stepped manner on the inner circumference of the chuck sleeve 80. The large-diameter part 76 of the coupling tube 75 is mated (fitted) in the rear inner-diameter part 82.

As shown also in FIG. 8, two engaging-recessed parts 85a, 85b are formed in the middle inner-diameter part 83. The engaging-recessed parts 85a, 85b are disposed spaced apart in the circumferential direction of the middle inner-diameter part 83, preferably at diametrically opposite positions. The length of the engaging-recessed part 85a in the circumferential direction is longer than the length of the engaging-recessed part 85b.

The small-diameter part 77 of the coupling tube 75 is mated (fitted) in the middle inner-diameter part 83. In this mated state, the projection parts 56a, 56b of the plate spring 55, which respectively protrude from (through, across) the openings 77a, 77b, engage with (in) the engaging-recessed parts 85a, 85b, respectively, of the middle inner-diameter part 83.

Three latching projections 86, which protrude radially inward (i.e. toward the center of the front inner-diameter part 84), are formed equispaced in the circumferential direction on the front inner-diameter part 84. The latching-plate parts 79 of the coupling tube 75 are respectively inserted, from the rear, into the interior of the front inner-diameter part 84 between adjacent ones of the latching projections 86, 86. Thereby, the latching projections 86 respectively latch (engage) with the latching-plate parts 79 frontward and rearward in the relative rotational direction of the latching-plate parts 79 (i.e. in the circumferential direction of the coupling tube 75). A tip inner-diameter part 87, which latches in (with) the front ridge 65 of the tubular part 41, is formed on the front sides of the latching projections 86.

To assemble the chuck part 30, first, the second bearing 42 is externally mounted on the discoidal part 40 of the chuck body 31 and is then screw-fastened by the restricting plate 50. Next, the chuck jaws 67 are inserted into the slanted holes 61, and the thrust washer 70 is externally mounted on the tubular part 41. Next, the screw ring 72 and the coupling tube 75 are externally mounted on the tubular part 41, and the screw parts (male threads) 69 of the chuck jaws 67 are screwed (meshed) with the female-thread part 74 of the screw ring 72. In this state, the spindle 32 of the chuck body 31 is inserted into the first bearing 34, which is held in the bearing-retaining part 33 of the gear housing 6, and the rear end of the spindle is coupled to (with) the lock cam 35. At the same time, the second bearing 42 of the discoidal part 40 is mated (fitted) from the front in the receiving surface 43 of the gear housing 6 and is thereby retained by the bearing retainer 46. In so doing, the chuck body 31 is assembled (mounted) onto the gear housing 6.

Figure 9:
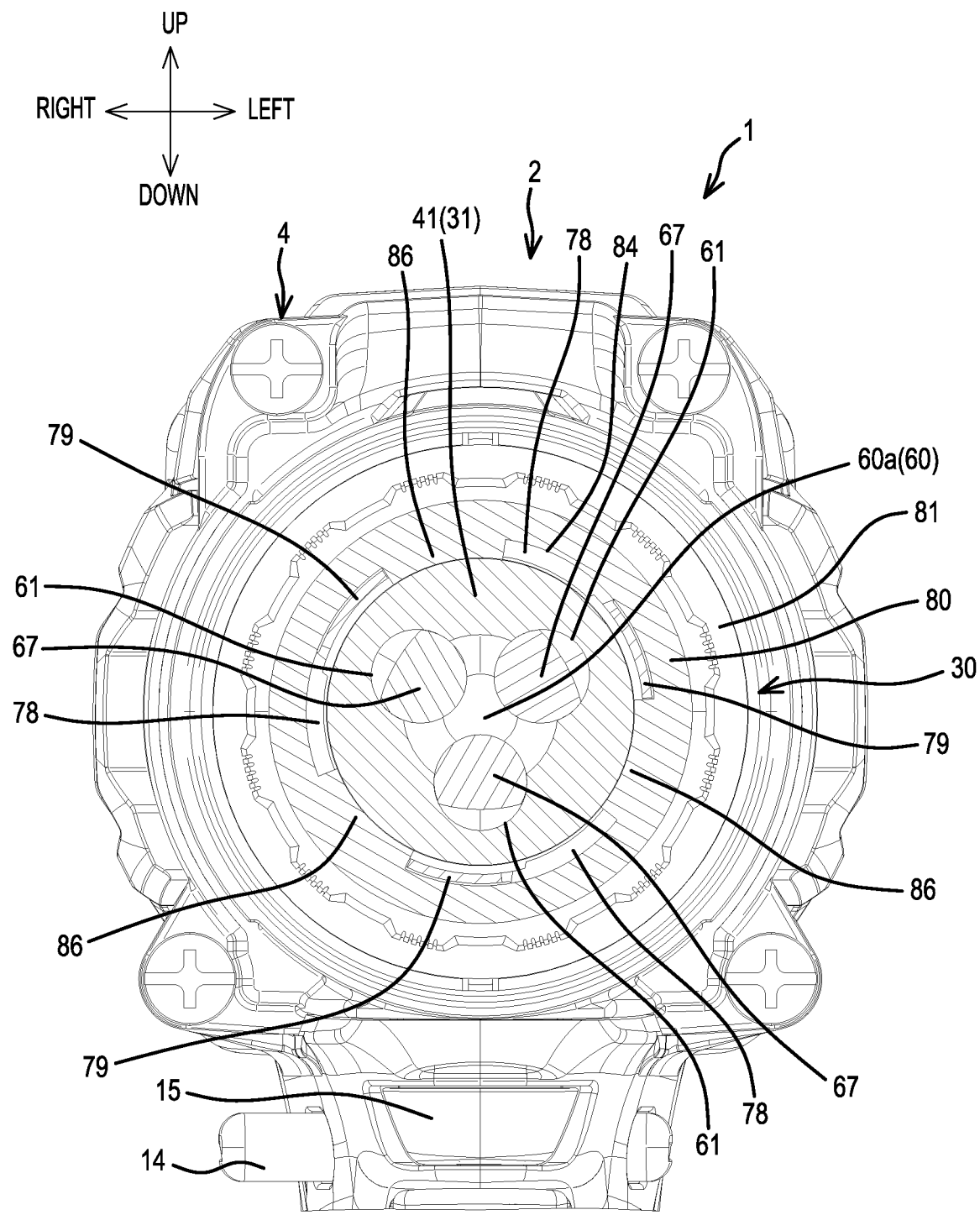
FIG. 9 is a cross-sectional view taken along line C-C in FIG. 5.

Next, in the state in which the engaging-recessed parts 85a, 85b are aligned with the phases of the projection parts 56a, 56b, which protrude from the small-diameter part 77 of the coupling tube 75, the chuck sleeve 80 is externally mounted, from forward of the tubular part 41, until the tip inner-diameter part 87 makes contact with the front ridge 65. In so doing, the projection parts 56a, 56b respectively engage with the engaging-recessed parts 85a, 85b. At the same time, as shown in FIG. 9, the latching-plate parts 79 are inserted between the latching projections 86, 86.

Furthermore, a retaining ring 88 is latched in the latching groove 66 of the tubular part 41, which causes the chuck sleeve 80 to be retained with respect to the forward direction while being in a rotatable state. The flange part 81 is proximate to the bearing retainer 46.

As described above, in the state in which rotation of the spindle 32 is locked by the lock cam 35 and the lock ring 36, the chuck sleeve 80 is manually rotated. In so doing, both the coupling tube 75 and the screw ring 72 follow and rotate via the projection parts 56a, 56b, which respectively engage with the engaging-recessed parts 85a, 85b. Owing to the rotation of the screw ring 72, the chuck jaws 67, which are screwed (meshed, threaded) with the screw parts 69, are caused to move synchronously forward and rearward, thereby causing the grasp parts 68 at the front ends to expand or contract (radially spread apart or converge together) depending on the direction of rotation of the chuck sleeve 80 relative to the chuck body 31. Thereby, the holding and releasing of a bit by the grasp parts 68 becomes possible. In particular, when the bit is to be held, the rotational load becomes high at the end of the tightening of the chuck sleeve 80. In so doing, the engaging-recessed parts 85a, 85b respectively press the projection parts 56a, 56b radially inward and thereby are caused to elastically deform, whereby rotation of the chuck sleeve 80 relative to the projection parts 56a, 56b is permitted, and the latching projections 86 are caused to latch with the latching-plate parts 79. Thereafter, the coupling tube 75 and the screw ring 72 can be rotated with a stronger force. It is noted that, in the state in which the bit is held, even if a force in the loosening direction is unintentionally imparted to the chuck sleeve 80, the projection parts 56a, 56b will elastically deform in response, thereby absorbing most or all of the unintentionally-applied force (rotational force). That is, because a significantly reduced force or no force in the loosening direction is transmitted to the coupling tube 75 and the screw ring 72, loosening of the bit tends not to occur even if the chuck sleeve 80 is subjected to such an unintentional force in the loosening direction.

As shown in FIGS. 1-3, in this assembled state, the chuck part 30 is housed within the gear housing 6, except for front portions of the chuck sleeve 80 and the tubular part 41 and front portions of the chuck jaws 67. Thereby, the length, with which the chuck part 40 protrudes forward from the gear housing 6, becomes shorter than that of the above-described known structure, in which the drill chuck is a separate body that is coupled to the spindle.

A space S, within which the rearward movement of each of the chuck jaws 67 is permitted, is formed within the gear housing 6 between the bearing-retaining part 33 and the chuck body 31. Even though this space S exists, because the rear portion of the chuck body 31 fits within the gear housing 6, the length of the spindle 32 in the front-rear direction is shorter than in the above-described known structure, in which the drill chuck is coupled as a separate body.

In addition, because the chuck part 30 includes the chuck sleeve 80 and fits within the outer diameter of the gear housing 6 in front view, the chuck part 30 does not protrude radially outward of the gear housing 6. In other words, an outermost or largest diameter of the chuck part 30 is less than the outermost or largest diameter of the gear housing 6.

To operate the driver-drill 1 configured as described above, in the state in which the bit is held by the chuck jaws 67 of the chuck part 30, a user pulls the trigger 13. In so doing, the switch 12 turns ON, the controller 11 causes the motor 16 to operate, and thereby the rotary shaft 19 rotates. Owing to the rotation of the rotary shaft 19, the spindle 32 rotates via the speed-reducing mechanism 21; thereby, the spindle 32 and the chuck body 31, which is integral with the spindle 32, also rotate, and it becomes possible to perform work, such as drilling, screw tightening, and the like, using the chucked bit.

Because the portion of the chuck part 30 that protrudes from the gear housing 6 is short and is compact also in the radial direction, it becomes easy to perform work even in tight spaces. In addition, it becomes easier to see the bit at the tip during work.

In addition, because the chuck body 31 is directly supported by the gear housing 6 via the second bearing 42, wobbling of the bit relative to the axis of the spindle 32, while the chuck body 31 and the bit are rotating, is reduced.

An operation-and-display panel 27 is provided on an upper surface of the battery-mounting part 8. The operation-and-display panel 27 is electrically connected to the controller 11, which makes it possible to, for example, turn an automatic motor-stop function ON and OFF. The automatic motor-stop function stops the supply of electrical current to the motor 16 when the load current of the motor 16 reaches a set value (stop torque). Thereby, in the state in which the automatic motor-stop function has been turned ON by the operation-and-display panel 27, when the torque of the chuck body 31 and the spindle 32 reaches the stop torque during an operation to perform screw tightening or the like, the current supply to the motor 16 is stopped, and thereby the rotation of the chuck body 31 and the spindle 32 stops. The stop torque can be modified by manipulation (manual rotation) of a dial 28, which is provided on a front end of the battery-mounting part 8.

The above-described driver-drill 1 comprises the motor 16, the spindle 32, which is rotationally driven by the motor 16 (e.g., via the speed-reduction mechanism 21), and the chuck part (chuck) 30, which rotates integrally with the spindle 32. The chuck part 30 comprises: the chuck body 31; the chuck sleeve 80, which is externally mounted on the chuck body 31; and the two or more chuck jaws 67, which are provided in the chuck body 31 and which are configured to expand and contract (radially spread apart and converge together) relative to the axial direction (rotational axis) of the spindle 32 in response to manual rotation of the chuck sleeve 80. Furthermore, the spindle 32 is integrally formed with the chuck body 31.

According to this configuration, the overall length of the chuck part 30, including the spindle 32, in the axial (front-rear) direction is shorter than that of the known structure described in the introduction above, in which the drill chuck is a separate body that is coupled to the spindle. Consequently, the overall length of the spindle 32 in the axial direction may be shortened, thereby providing a more compact driver-drill 1.

The spindle 32 is disposed in the front-rear direction within the tube-shaped gear housing 6 (housing), which protrudes forward; a rear end of the spindle 32 is supported by the first bearing 34 within the gear housing 6. Thus, the chuck body 31 is rotatably supported by both the first bearing 34 within the gear housing 6 and by the second bearing 42 disposed forward thereof. Thereby, an improvement of runout accuracy is achieved. In addition, because a portion of the chuck body 31 can be received within the gear housing 6, this design feature results in much more compactness of the overall length in the axial direction.

With regard to the chuck body 31, the tubular part 41, which is forward of the bearing 42, protrudes forward from the gear housing 6, and the chuck sleeve 80 is externally mounted on the tubular part 41 of the chuck body 31. Thereby, the chuck sleeve 80 can be easily assembled (mounted) onto the chuck body 31 during manufacture.

The outer diameter of the chuck part 30, which includes the chuck sleeve 80, is smaller than the outer diameter of the gear housing 6. Therefore, the chuck part 30 is also compact in the radial direction.

The second bearing 42 mates with (is fitted in) the receiving surface 43, which is defined on the inner-circumferential surface of the gear housing 6, and is held within the gear housing 6. Furthermore, the second bearing 42 is retained (held, fixed) by the bearing retainer 46, which is screwed into the receiving surface 43 forward of the second bearing 42.

Thereby, the assembly (mounting) of the second bearing 42 into the gear housing 6 and the positioning of the second bearing 42 in the front-rear direction therein can be performed from the front in a simple manner.

The second bearing 42 is disposed more outward in the radial direction of the gear housing 6 than the chuck jaws 67 are. In other words, the inner diameter of the second bearing 42 is larger than a circumscribed circle of the rearward ends of the chuck jaws 67. As a result, the chuck body 31, which includes the chuck jaws 67, can be made more compact in the radial direction.

The chuck sleeve 80 is externally mounted on the chuck body 31 from the front and is retained by the retaining ring 88 (retaining member), which is caused to engage with the chuck body 31. Thereby, the chuck sleeve 80 can be assembled onto the chuck body 31 in a simple manner.

The chuck sleeve 80 makes contact with the front ridge 65 (stop part), which is provided in the chuck body 31. Thereby, the positioning of the chuck sleeve 80 on the rearward side can be performed easily.

The above-described driver-drill 1 comprises the motor 16, the spindle 32, which is rotationally driven by the motor 16 (e.g., via a speed-reduction mechanism 21), and the chuck part (chuck) 30, which rotates integrally with the spindle 32. The chuck part 30 comprises: the chuck body 31; the chuck sleeve 80, which is externally mounted on the chuck body 31; and the two or more chuck jaws 67, which are provided (disposed) in the chuck body 31 and which are configured to expand and contract (radially spread apart and converge together) relative to the axial direction (rotational axis) of the spindle 32 in response to manual rotation of the chuck sleeve 80. Furthermore, the chuck body 31 is supported by the second bearing 42, which is disposed within the tube-shaped gear housing 6 such that the inner ring 42a of the second bearing 42 is located more outward in the radial direction than the chuck jaws 67.

According to this configuration, because the chuck body 31 is directly supported by the second bearing 42, in addition to the spindle 32 being directly supported by the first bearing 34 in the gear housing 6, an improvement of the runout accuracy can be expected owing to the fact that the chuck part 30 is rotatably supported by two bearings 34, 42 that are spaced apart in the axial direction. In addition, the chuck body 31, which includes the chuck jaws 67, can be made more compact in the radial direction.

Modified examples of the present disclosure are explained below.

The number of the bearings that directly rotatably support the chuck body is not limited to one, and two or more may be disposed in (along) the axial direction of the chuck body.

A bearing other than a ball bearing can also be used as the bearing that supports the chuck body. The positioning of the bearing also can be modified as appropriate. The bearing that supports the spindle can be modified in the same manner as the bearing that supports the chuck body.

The positioning of the chuck sleeve on the rearward side may be performed by causing the rear end thereof to make contact with the bearing retainer or the gear housing. In addition, a rear-end portion of the chuck sleeve may be formed with a diameter larger than the outer diameter of the gear housing, and that rear-end portion may be externally mounted on the front end of the gear housing. If the chuck sleeve is designed to overlap the gear housing in the radial direction in this manner, manipulatability with regard to the rotational manipulation of the chuck sleeve is improved. In addition, a dustproofing effect also can be obtained.

The number, shape, and the like of the chuck jaws, the structures relating to the expansion and contraction of the chuck jaws, and the like are not limited to the above-mentioned examples and can be modified as appropriate.

The housing is not limited to one that comprises the main-body housing and the gear housing. Even if a structure, in which the motor-housing part protrudes forward, is used instead of the gear housing, the chuck part according to the present disclosure is still applicable.

The motor may also be a commutator (brushed) motor or the like instead of a brushless motor. The number of stages of the speed-reducing mechanism can be increased or decreased. The speed-changing mechanism may be omitted.

The electronic clutch can be configured to be selectable by providing, instead of the operation-and-display panel, for example, a manually-manipulatable unit (e.g., a torque-adjusting ring) on the upper surface or a side surface of the main body. The location of the dial also can be modified (moved). The clutch-actuation torque can also be modified by eliminating the dial and using an operation unit such as the operation-and-display panel. A mechanical clutch can also be used instead of the electronic clutch.

The present disclosure can also be adapted to a driver-drill comprising a hammer mechanism. The driver-drill of the present disclosure may be an AC tool that uses an AC power supply instead of the battery pack.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools that hold a tool accessory using a chuck, such as a driver-drill, a hammer drill, etc.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Driver-drill
2 Main body
3 Grip part
4 Main-body housing
6 Gear housing
16 Motor
19 Rotary shaft
21 Speed-reducing mechanism
30 Chuck part (Chuck)
31 Chuck body
32 Spindle
34 First bearing
40 Discoidal part
41 Tubular part
42 Second bearing
43 Receiving surface
44 Step part (Step, Stop)
46 Bearing retainer
50 Restricting plate
51 Screw
55 Plate spring
61 Slanted hole 65 Front ridge (stop part)
67 Chuck jaw
72 Screw ring
75 Coupling tube
80 Chuck sleeve
88 Retaining ring

The invention claimed is:

1. A driver-drill, comprising:
a motor;
a spindle configured to be rotationally driven using rotational energy output by the motor; and
a chuck, which rotates integrally with the spindle;
wherein:
the chuck comprises: a chuck body; a chuck sleeve, which is externally mounted on the chuck body; and two or more chuck jaws, which are provided in the chuck body and are configured to radially spread apart and converge together relative to a rotational axis of the spindle in response to manual rotation of the chuck sleeve;
the spindle is formed integrally with the chuck body such that there is no seam between the spindle and the chuck body;
the spindle extends in a front-rear direction within a tube-shaped housing that protrudes forward;
a rear end of the spindle is rotatably supported by a first bearing within the tube-shaped housing;
the chuck body is rotatably supported by a second bearing;
the second bearing is disposed forward of the first bearing within the tube-shaped housing;
the second bearing mates with a receiving surface defined on an inner-circumferential surface of the tube-shaped housing and is held within the tube-shaped housing; and
the second bearing is retained by a bearing retainer that is screwed into the receiving surface forward of the second bearing.

2. The driver-drill according to claim 1, wherein:
a forward portion of the chuck body protrudes forward from the tube-shaped housing more than the second bearing does; and
the chuck sleeve is externally mounted on a protruding portion of the chuck body.

3. The driver-drill according to claim 2, wherein an outer diameter of the chuck, which includes the chuck sleeve, is smaller than an outer diameter of the housing.

4. The driver-drill according to claim 3, wherein an inner diameter of the second bearing is larger than a circumscribed circle defined by rearward ends of the chuck jaws.

5. The driver-drill according to claim 4, wherein the chuck sleeve is externally mounted on the chuck body and is retained by a retaining member.

6. The driver-drill according to claim 5, wherein the chuck sleeve contacts a stop part defined on an outer circumference of the chuck body, the stop part defining a rearward position of the chuck sleeve.

7. The driver-drill according to claim 1, wherein an outer diameter of the chuck, which includes the chuck sleeve, is smaller than an outer diameter of the housing.

8. The driver-drill according to claim 1, wherein an inner diameter of the second bearing is larger than a circumscribed circle defined by rearward ends of the chuck jaws.

9. The driver-drill according to claim 1, wherein the chuck sleeve is externally mounted on the chuck body and is retained by a retaining member.

10. The driver-drill according to claim 9, wherein the chuck sleeve contacts a stop part defined on an outer circumference of the chuck body, the stop part defining a rearward position of the chuck sleeve.

11. The driver-drill according to claim 1, wherein:
the second bearing is positioned in the front-rear direction between a flange and a restricting plate;
the flange extends radially outward from the chuck body and has an outer diameter that is larger than an inner ring of the bearing;
the flange contacts a front side of the inner ring of the bearing in the front-rear direction; and
the restricting plate is affixed to the chuck body and contacts a rear side of the inner ring of the bearing in the front-rear direction.

12. The driver-drill according to claim 11, wherein:
the flange does not contact an outer ring of the second bearing; and
the restricting plate is affixed to a rear surface of the chuck body by screws that extend into the rear surface of the chuck body.

13. A driver-drill, comprising:
a motor;
a spindle configured to be rotationally driven using rotational energy output by the motor; and
a chuck, which rotates integrally with the spindle;
wherein:
the chuck comprises: a chuck body; a chuck sleeve, which is externally mounted on the chuck body; and two or more chuck jaws, which are provided in the chuck body and are configured to expand and contract relative to an axial direction of the spindle in response to manual rotation of the chuck sleeve;
a bearing is disposed within a tube-shaped housing and rotatably supports the chuck body;
an inner diameter of the bearing is larger than a circumscribed circle defined by rearward ends of the chuck jaws;
the bearing mates with a receiving surface defined on an inner-circumferential surface of the housing and is thereby held within the tube-shaped housing, and
the bearing is retained by a bearing retainer that is screwed into the receiving surface forward of the bearing.

14. The driver-drill according to claim 13, wherein the spindle is formed integrally with the chuck body without a seam between the spindle and the chuck body.

15. The driver-drill according to claim 13, wherein the chuck sleeve is externally mounted on the chuck body and is retained by a retaining member.

16. The driver-drill according to claim 15, wherein the chuck sleeve contacts a stop part defined on an outer circumference of the chuck body, the stop part defining a rearward position of the chuck sleeve.

17. The driver-drill according to claim 13, further comprising another bearing that rotatably supports the spindle and is disposed spaced apart from the bearing that rotatably supports the chuck body in the axial direction of the spindle.

18. The driver-drill according to claim 17, wherein:
the spindle is formed integrally with the chuck body without a seam between the spindle and the chuck body;
and
the bearing that rotatably supports the chuck body radially surrounds the chuck body.

19. The driver-drill according to claim 18, wherein:
the bearing is positioned in a direction parallel to a rotational axis of the spindle between a flange and a restricting plate;

the flange extends radially outward from the chuck body and has an outer diameter that is larger than an inner ring of the bearing;

the flange contacts a first side of the inner ring of the bearing; and the restricting plate is affixed to the chuck body and contacts a second side of the inner ring of the bearing that is opposite of the first side of the inner ring of the bearing in the direction parallel to the rotational axis of the spindle.

20. The driver-drill according to claim 13, wherein:

the bearing is positioned in a direction parallel to a rotational axis of the spindle between a flange and a restricting plate;

the flange extends radially outward from the chuck body and has an outer diameter that is larger than an inner ring of the bearing;

the flange contacts a first side of the inner ring of the bearing; and the restricting plate is affixed to the chuck body and contacts a second side of the inner ring of the bearing that is opposite of the first side of the inner ring of the bearing in the direction parallel to the rotational axis of the spindle.

* * * * *